(12) United States Patent
Sabol et al.

(10) Patent No.: US 7,572,524 B2
(45) Date of Patent: *Aug. 11, 2009

(54) METHOD OF INSTRUMENTING A COMPONENT

(75) Inventors: Stephen M. Sabol, Orlando, FL (US); Ramesh Subramanian, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 415 days.

This patent is subject to a terminal disclaimer.

(21) Appl. No.: 11/215,603

(22) Filed: Aug. 30, 2005

(65) Prior Publication Data

US 2005/0287386 A1    Dec. 29, 2005

Related U.S. Application Data

(63) Continuation-in-part of application No. 11/122,566, filed on May 5, 2005, which is a continuation-in-part of application No. 11/018,816, filed on Dec. 20, 2004, now Pat. No. 7,270,890, and a continuation-in-part of application No. 10/252,236, filed on Sep. 23, 2002, now Pat. No. 6,838,157.

(60) Provisional application No. 60/581,662, filed on Jun. 21, 2004.

(51) Int. Cl.
*B32B 15/04* (2006.01)
*C23C 4/00* (2006.01)

(52) U.S. Cl. .................. 428/701; 428/332; 428/702; 427/446; 427/455; 427/556

(58) Field of Classification Search ............. None
See application file for complete search history.

(56) References Cited

U.S. PATENT DOCUMENTS 3,876,998 A    4/1975    Richter et al.

(Continued)

FOREIGN PATENT DOCUMENTS

EP    0 576 400 A1    12/1993

(Continued)

OTHER PUBLICATIONS

Jon Longtin, Sanjay Sampath, Richard J. Gambino, and Szymon Tankiewicz, Robert Greenlaw; Sensors for Harsh Environments by Direct Write Thermal Spray; Center for Thermal Spray Research, State University of New York, Stony Brook, NY, and Integrated Coatings Solutions, Inc., Huntington Beach, CA.

(Continued)

*Primary Examiner*—Timothy M Speer

(57) ABSTRACT

A method of instrumenting a first component (210) for use in a combustion turbine engine (10) wherein the first component (210) has a surface contacted by a second component during operation of the combustion turbine engine (10). The method may include depositing an insulating layer (260) on the surface of the first component (210) and depositing a first conductive lead (232, 254) on the insulating layer (260). A piezoelectric material (230) may be deposited in electrical communication with the first conductive lead (232, 254) and a second conductive lead (236, 256) may be deposited in electrical communication with the piezoelectric material (230) and be insulated from the first conductive lead (232, 254) to form a sensor (50) for detecting pressure exerted on the surface of the first component (210) during operation of the combustion turbine engine (10).

24 Claims, 8 Drawing Sheets

U.S. PATENT DOCUMENTS

| | | |
|---|---|---|
| 3,890,456 A | 6/1975 | Dils |
| 4,382,377 A | 5/1983 | Kleinschmidt et al. |
| 4,546,652 A | 10/1985 | Virkar et al. |
| 4,578,992 A | 4/1986 | Galasko et al. |
| 4,595,298 A | 6/1986 | Frederick |
| 4,812,050 A | 3/1989 | Epstein et al. |
| 4,851,300 A | 7/1989 | Przybyszewski |
| 4,916,715 A | 4/1990 | Adiutori |
| 4,970,670 A | 11/1990 | Twerdochlib |
| 4,983,034 A | 1/1991 | Spillman, Jr. |
| 5,144,299 A | 9/1992 | Smith |
| 5,440,300 A | 8/1995 | Spillman, Jr. |
| 5,608,282 A | 3/1997 | Wilber et al. |
| 5,952,836 A | 9/1999 | Haake |
| 5,969,260 A | 10/1999 | Belk et al. |
| 5,970,393 A | 10/1999 | Khorrami et al. |
| 6,000,977 A | 12/1999 | Haake |
| 6,034,296 A | 3/2000 | Elvin et al. |
| 6,109,783 A | 8/2000 | Dobler et al. |
| 6,142,665 A | 11/2000 | Haffner et al. |
| 6,197,424 B1 | 3/2001 | Morrison et al. |
| 6,251,488 B1 | 6/2001 | Miller et al. |
| 6,262,550 B1 | 7/2001 | Kliman et al. |
| 6,299,410 B1 | 10/2001 | Hilbert et al. |
| 6,331,823 B1 | 12/2001 | El-Ibiary |
| 6,343,251 B1 | 1/2002 | Herron et al. |
| 6,356,340 B1 | 3/2002 | Spence |
| 6,398,503 B1 | 6/2002 | Takahashi et al. |
| 6,422,743 B1 | 7/2002 | Nirmalan et al. |
| 6,437,681 B1 | 8/2002 | Wang et al. |
| 6,512,379 B2 | 1/2003 | Harrold et al. |
| 6,523,383 B2 | 2/2003 | Joki et al. |
| 6,532,412 B2 | 3/2003 | Adibhatla et al. |
| 6,556,956 B1 | 4/2003 | Hunt |
| 6,576,861 B2 | 6/2003 | Sampath et al. |
| 6,591,182 B1 | 7/2003 | Cece et al. |
| 6,604,431 B1 | 8/2003 | Soga et al. |
| 6,667,725 B1 | 12/2003 | Simons et al. |
| 6,735,549 B2 | 5/2004 | Ridolfo |
| 6,756,908 B2 | 6/2004 | Gass et al. |
| 6,760,689 B2 | 7/2004 | Follin et al. |
| 6,796,187 B2 | 9/2004 | Srinivasan et al. |
| 6,805,949 B1 | 10/2004 | Roche et al. |
| 6,816,817 B1 | 11/2004 | Retlich et al. |
| 6,831,555 B1 | 12/2004 | Miller et al. |
| 6,838,157 B2 * | 1/2005 | Subramanian ............. 428/173 |
| 6,841,116 B2 | 1/2005 | Schmidt |
| 6,887,528 B2 | 5/2005 | Lau et al. |
| 7,270,890 B2 * | 9/2007 | Sabol et al. ................ 428/632 |
| 2004/0202886 A1 | 10/2004 | Subramanian |
| 2008/0054645 A1 * | 3/2008 | Kulkarni et al. ............... 290/52 |

OTHER PUBLICATIONS

L. Lü, J. Y. H. Fuh, Y. S. Wong; Metal-Based System Via Laser Melting; Laser-Induced Materials and Processes for Rapid Prototyping; pp. 143-186; Chapter 6; The National University of Singapore; Kluwer Academic Publishers; Boston.

Sansay Sampath, Jon Longtin, Richard Gambino, Herbert Herman, Robert Greenlaw, and Ellen Tormey; Chapter 9: Direct-Write Thermal Spraying of Multilayer Electronics and Sensor Structures; Direct-Write Technologies for Rapid Prototyping Applications: Sensors, Electronics, and Integrated Power Sources; Copyright 2002; pp. 261-302; Academic Press, A Division of Harcourt, Inc.; San Diego.

* cited by examiner

METHOD OF INSTRUMENTING A COMPONENT

CROSS REFERENCE TO RELATED APPLICATIONS

This application is a continuation-in-part of pending application Ser. No. 11/122,566 filed May 5, 2005, which is a continuation-in-part of application Ser. No. 11/018,816 filed Dec. 20, 2004 now U.S. Pat. No. 7,270,890, which claims the benefit of U.S. Provisional Patent Application No. 60/581,662 filed Jun. 21, 2004 and is a continuation-in-part of application Ser. No. 10/252,236 filed Sep. 23, 2002, U.S. Pat. No. 6,838,157, all of which are specifically incorporated herein by reference.

FIELD OF THE INVENTION

The present invention relates generally to monitoring operating environments and in particular to embedded sensors for sensing operating parameters of components within an operating environment such as a gas turbine engine.

BACKGROUND OF THE INVENTION

Despite the extreme sophistication of gas turbine engines, such as turbines for generating electrical power or aircraft engines for commercial and military use, designers and operators have deficient information with respect to the operational relationship of certain engine components. This is due at least in part to harsh operating conditions and close tolerances between certain components, which often prevent using traditional sensors for collecting accurate information of critical engine components.

Some components within a turbine engine are assembled using a slip fit such as a dovetail, fir tree, T-slot and others. Turbine components such as vanes and ring segments may slide into grooves and be held in place with air pressure used to cool the components during operation. Turbine blades may fit into a turbine disk and be held in place by centrifugal force during operation. Nonetheless, turbine vanes, blades and other components tend to vibrate during operation due to air flowing through the turbine. This flow induced vibration leads to wear at contact surfaces causing inefficient turbine operation and may lead to critical component failure.

DETAILED DESCRIPTION OF THE INVENTION

Figure 1:
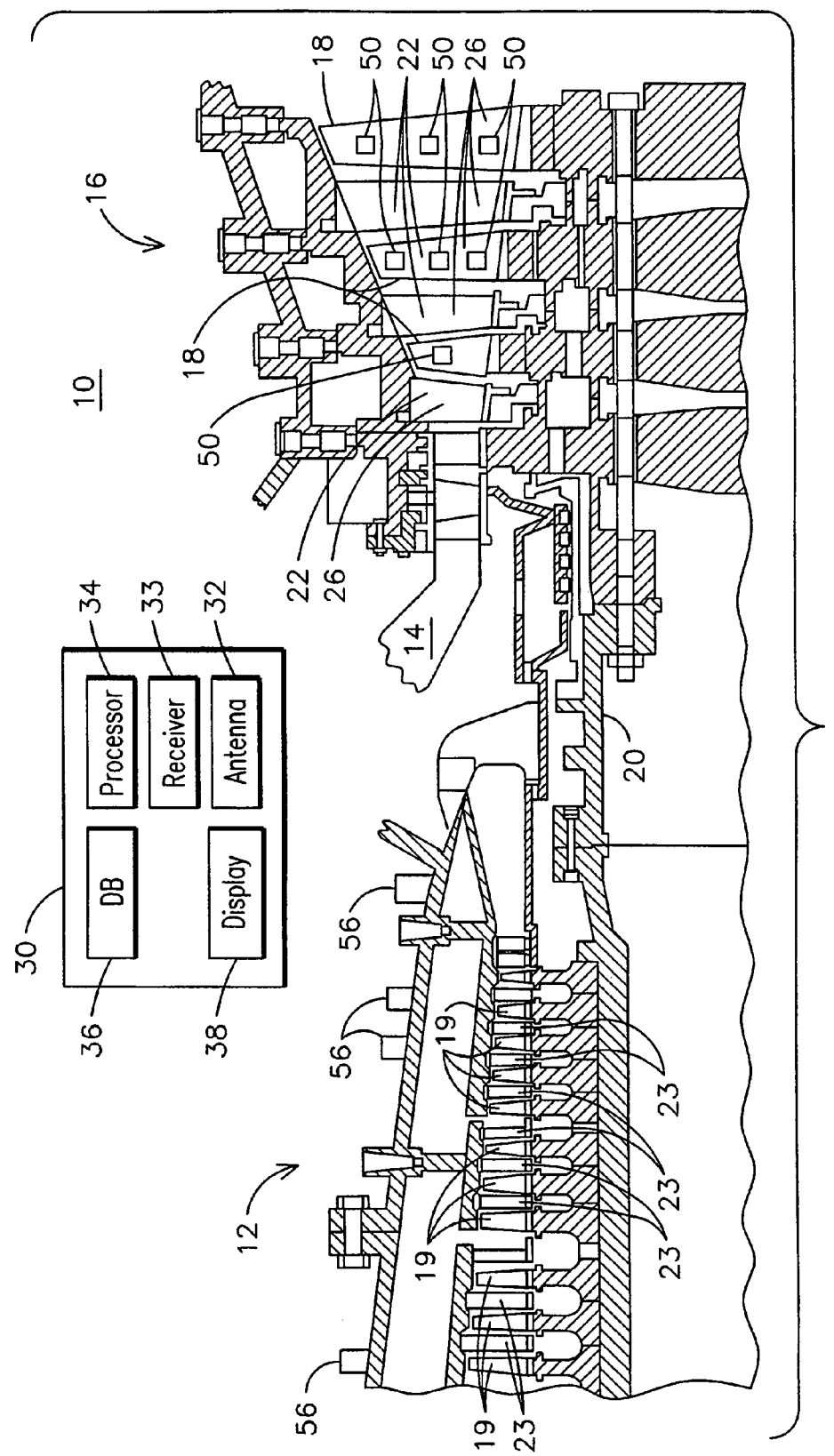
FIG. 1 is a cross sectional view of an exemplary combustion turbine with which embodiments of the invention may be used and an exemplary monitoring and control system for collecting and analyzing component data from the combustion turbine.

FIG. 1 illustrates an exemplary combustion turbine 10 such as a gas turbine used for generating electricity as will be recognized by those skilled in the art. Embodiments of the invention may be used with combustion turbine 10 or in numerous other operating environments. For example, embodiments may be used in aircraft engines for evaluating operation parameters and relationships of vibrating component.

Combustion turbine 10 may include a compressor 12, at least one combustor 14 (broken away) and a turbine 16. Compressor 12, combustor 14 and turbine 16 are sometimes referred to collectively as a gas turbine engine. Turbine 16 includes a plurality of rotating blades 18, secured to a rotatable central shaft 20. A plurality of stationary vanes 22 are positioned between blades 18, with vanes 22 being dimensioned and configured to guide air over blades 18. Blades 18 and vanes 22 will typically be made from nickel-cobalt, and may be coated with a thermal barrier coating 26, such as yttria-stabilized zirconia. Similarly, compressor 12 includes a plurality of rotating blades 19 positioned between respective vanes 23.

Embodiments of the invention may be used to acquire diagnostic information pertaining to blades 18 and vanes 22 as well as other components subject to flow induced vibration including combustor 14, fuel nozzles, "swirlers", cross flame tubes, ring segments, isolation rings, thermocouples, seals and other components recognized by those skilled in the art.

In use, air is drawn in through compressor 12, where it is compressed and driven towards combustor 14. Combustor 14 mixes the air with fuel and ignites it thereby forming a working gas. This working gas will typically be above 1300° C. This gas expands through turbine 16, being guided across blades 18 by vanes 22. As the gas passes through turbine 16, it rotates blades 18 and shaft 20, thereby transmitting usable mechanical work through shaft 20. Combustion turbine 10 may also include a cooling system (not shown), dimensioned and configured to supply a coolant, for example steam or compressed air, to blades 18 and vanes 22.

The environment wherein blades 18 and vanes 22 operate is subject to high operating temperatures and is particularly harsh, which may result in serious deterioration of blades 18 and vanes 22. This is especially likely if the thermal barrier coating 26 should spall or otherwise deteriorate. Embodiments of the invention are advantageous because they allow components to be configured for transmitting data indicative of operating parameters associated with components during operation of combustion turbine 10. Blades 18, 19, vanes 22, 23, and coatings 26, for example, may be configured for transmitting data indicative of operating characteristics of those components. This date may be collected and analyzed in real time and used for various purposes such as to directly monitor those operating characteristics during operation, develop predictive maintenance schedules, control operating parameters, validate design models and minimize resonance of combustion turbine 10 components.

FIG. 1 also illustrates a schematic of an exemplary monitoring and control system 30 that may include an antenna 32, a receiver 33, a processor or CPU 34, a database 36 and a display 38. Processor 34, database 36 and display 38 may be conventional components and antenna 32 and receiver 33 may have performance specifications that are a function of various embodiments of the invention. For example, antenna 32 and receiver 33 may be selected for receiving wireless telemetry data transmitted from a plurality of transmitters deployed in various locations throughout combustion turbine 10 as more fully described below.

Embodiments of the present invention allow for a plurality of sensors to be embedded within the respective coatings of a plurality of components within combustion turbine 10. Alternate embodiments allow for the sensors to be surface mounted or deposited to components, especially those contained in areas where components do not require a barrier coating such as the compressor 12. Exemplary embodiments of sensors may be used to provide data to system 30 with respect to the load exerted on an area of interest of a component, such as an area contacting another component during operation. Data may also be transmitted with respect to the acceleration of a component and/or properties of a component's coating as well as other component or coating specific information.

It will be appreciated that aspects of the invention allow for various sensor configurations to be embedded within a barrier coating such as a barrier coating 26 of blades 18 or vanes 22 as well as other components of turbine 16. U.S. Pat. No. 6,838,157, which is specifically incorporated herein by reference, describes various embodiments of methods for instrumenting gas turbine components that may be utilized with aspects of the present invention. This patent discloses various methods of forming trenches in a barrier coating, forming a sensor in the coating and depositing a backfill material in the trench over the coating. Alternate embodiments allow for sensor configurations to be embedded during the formation of a functional coating such as a thermal barrier coating or wear coating, for example. Exemplary sensor configurations may be deposited on component surfaces as well.

U.S. Pat. No. 6,576,861, which is specifically incorporated herein by reference, discloses an exemplary direct write apparatus and process recognized in the art that may be used to deposit embodiments of sensors and sensor connectors with transmitters in accordance with aspects of the present invention. In this respect, the apparatus and processes disclosed therein may be used for the patterning of fine sensor and/or connector features of between about 100 microns and 500 microns. Multilayer electrical circuits and sensors may be formed by depositing features using conductive materials, resistive materials, dielectric materials, insulative materials and other application specific materials. It will be appreciated that other methods may be used to deposit multilayer electrical circuits and sensors in accordance with aspects of the invention. For example, thermal spraying, vapor deposition, laser sintering and curing deposits of material sprayed at lower temperatures may be used as well as other suitable techniques recognized by those skilled in the art.

Embodiments of the invention allow for a single sensor 50 or a plurality of sensors 50 to be deployed in numerous places within combustion turbine 10. In an embodiment, sensor 50 may be formed of a piezoelectric and/or piezoresistive material and deposited using the direct write apparatus. Piezoelectric and piezoresistive materials may be referred to collectively as piezo-material. Exemplary piezoelectric materials may include alpha-quartz, barium titanate, lead zirconium titanate, lithium niobate and others. Alternate embodiments allow for depositing piezoresistive materials to form exemplary sensors 50 such as a load cell or accelerometer. Sensor 50 may be used for monitoring component-specific or coating-specific conditions as well as collecting other data with respect to the operation or performance of combustion turbine 10. For example, FIG. 1 illustrates that one or more sensors 50 may be embedded within respective barrier coatings 26 of one or more blades 18 of turbine 16. It will be appreciated that sensors 50 may be embedded within barrier coatings, wear coatings and surfaces of other respective components with turbine 16 for which component-specific and/or coating-specific data is to be acquired.

Figure 2:
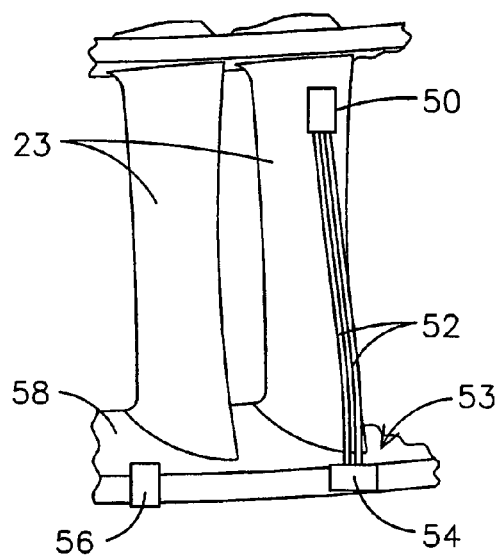
FIG. 2 a perspective view of an exemplary combustion turbine vane equipped with an exemplary embodiment of the present invention.

FIG. 2 illustrates a pair of vanes 23 removed from compressor 12 with one vane having a sensor 50 mounted or connected with vane 23 for detecting a condition of vane 23. A connector 52 may be provided as a means for routing a data signal from sensor 50 to a transmitter 54 configured for wirelessly transmitting the data signal to a transceiver 56. Connector 52 may be one or a plurality of electrical leads for conducting a signal from sensor 50 to a surface mounted transmitter 54. Alternate embodiments allow for various types of connectors 52 to be used as a means for routing a data signal from sensor 50 to transmitter 54, depending on the specific application. For example, one or a plurality of fiber optic connectors may be used for routing a signal using single or varying wavelengths of light.

Embodiments allow for transmitters 54 to be multi-channel and have various specifications depending on their location within a casing of combustion turbine 10. Transmitters 54 may be configured to function within the compressor 12 casing subject to operating temperatures of between about 80° C. to 120° C. They may also be configured to function within the turbine 12 casing subject to operating temperatures of between about 300° C. to 350° C. or higher, and be resistant to oxidative exposure.

Figure 3:
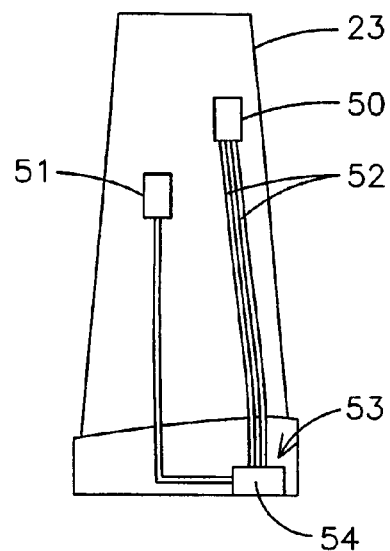
FIG. 3 is a schematic view of a vane of FIG. 2.

FIG. 3 illustrates a schematic plan view of compressor vane 23 having sensor 50 connected therewith and connector 52 connecting sensor 50 with transmitter 54. A power source 51 may be provided, such as an appropriately sized battery for powering transmitter 54. In alternate embodiments transmitter 54 may be located remotely from vane 23 and powered from an external power source. Transmitter 54 may receive signals from sensor 50 via connector 52 that are subsequently wirelessly transmitted to transceiver 56. Transceiver 56 may be mounted on hub 58 or on a surface external to compressor 12 such as the exemplary locations shown in FIG. 1. Transceiver 56 may be mounted in various locations provided it is within sufficient proximity to transmitter 54 to receive a wireless data transmission, such as an RF signal from transmitter 54. Transceiver 56 may transmit the RF signal to antenna 32 of system 30 where the signal may be processed for monitoring the condition of compressor vane 23.

With respect to FIGS. 2 and 3, one or more sensors 50 may be connected with one or more compressor vanes 23 by fabricating sensor 50 directly onto a surface of vane 23. Connector 52 may be deposited directly onto a surface of vane 23. In alternate embodiments a trench or recess may be formed within a surface of vane 23 that is sized for receiving a deposited sensor 50 and connector 52. Sensor 50 and connector 52 may be deposited within the recess and protected by depositing a coating of suitable material onto a surface of vane 23 over sensor 50 and connector 52. In other alternate embodiments a coating may be deposited onto a surface of vane 23, a trench may be formed within the coating and sensor 50 and connector 52 may be deposited within the trench. A protective coating may be deposited over sensor 50 and/or connector 52.

Connector 52 may extend from sensor 50 to a termination location, such as the peripheral edge of vane 23 so that a distal end 53 of connector 52 is exposed for connection to transmitter 54. Sensor 50 and connector 52 may be positioned on vane 23 to minimize any adverse affect on the aerodynamics of vane 23.

Figure 4:
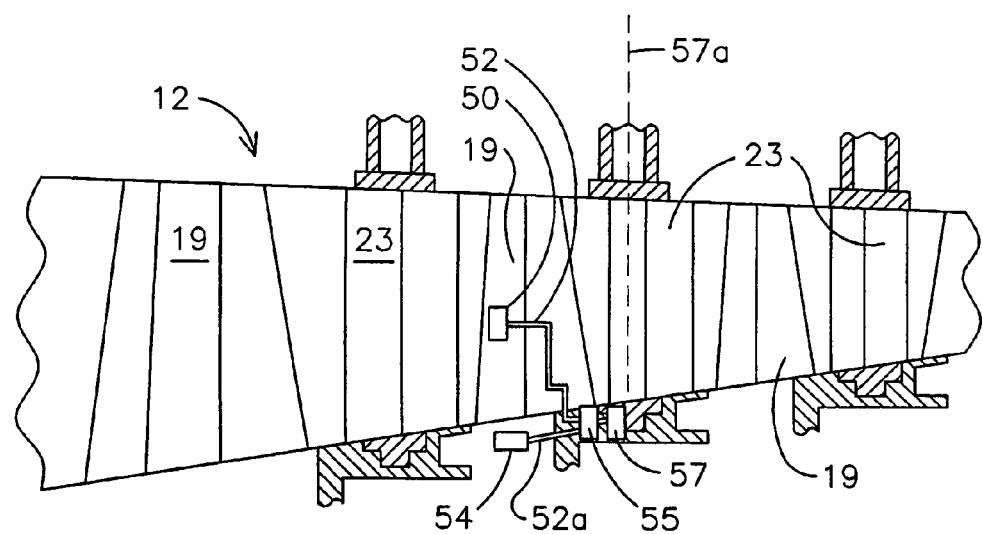
FIG. 4 is a schematic cross section of the compressor of FIG. 1.

In an embodiment, one or more sensors 50, such as strain gauges or thermocouples, for example, may be deposited on one or more turbine or compressor blades 18, 19. FIG. 4 illustrates an embodiment with respect to compressor 12. A connector 52 may be deposited to connect each sensor 50 to one or more transmitters 54 connected with blade 18, 19. It will be appreciated that exemplary embodiments allow for a plurality of sensors 50 to be connected with a single transmitter 54 via respective connectors 52. For example, a sensor 50 may be deposited on each of a plurality of blades 18, 19. A connector 52 may be deposited to route a signal from each sensor 50 to a single transmitter 54.

Transmitter 54 and a rotating antenna 55 may be mounted proximate the root of blade 18, 19. Connector 52 may be routed from sensor 50 aft to the root of blade 18, 19 to connect sensor 50 with rotating antenna 55, which may in turn be connected with transmitter 54 via a connector 52a. A stationary antenna 57 may be installed on a turbine or compressor vane 22, 23 aft of the root of respective blade 18, 19. A lead wire 57a may be routed from stationary antenna 57 out of compressor 12 or turbine 16 to broadcast a signal to system 30. In exemplary embodiments, such as that shown in FIG. 4, power may be generated through induction during operation of compressor 12 as will be appreciated by those skilled in the art. In this arrangement, transmitter 54 may transmit data to stationary antenna 57 via rotating antenna 55 and power may be supplied from stationary antenna 57 to transmitter 54.

It will be appreciated by those skilled in the art that one or more sensors 50 may be mounted to, such as by a spray deposition, each compressor blade 19 within a row of blades 19 mounted on a disk within compressor 12. A respective connector 52 may connect each sensor 50 to a respective transmitter 54 mounted proximate the root of each blade 19 within the row. Rotating antenna 55 may encircle the disk proximate the root of each blade 19 and be connected with each transmitter 54 via a respective connector 52a. One or more stationary antennas 57 may be installed on a compressor vane 23 aft of the row of compressor blades 19, or in another location, such as a compressor hub sufficiently proximate to rotating antenna 55 for signal broadcasting and receiving. Stationary antenna 57 may also encircle the row of blades 19. Rows of blades 18 in turbine 16 may be similarly configured.

Figure 5:
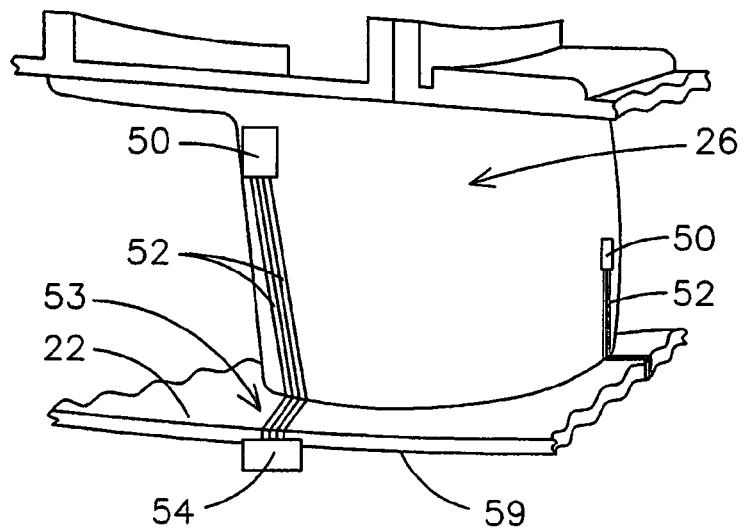
FIG. 5 is a perspective partial view of an exemplary embodiment of a smart component combustion in accordance with aspects of the invention.

FIG. 5 illustrates a partial view of a component, such as a vane 22 from turbine 16 having a barrier coating 26 deposited thereon. Sensor 50 and connector 52 may be embedded beneath an upper surface of barrier coating 26. Connector 52 may have a distal end 53 that is exposed at a termination location, such as proximate a peripheral edge 59 of vane 22 for connection with transmitter 54. In an embodiment transmitter 54 may be surface mounted to vane 22 or embedded within coating 26 proximate peripheral edge 59. Alternate embodiments allow for transmitter 54 to be located elsewhere such as on a platform (not shown) to which vane 22 is connected or in a cooling flow channel, for example, as will be recognized by those skilled in the art.

Figure 6A:
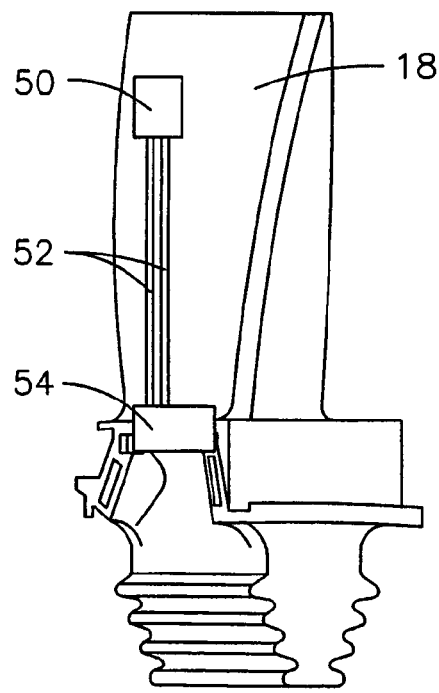
FIG. 6A is a schematic view of an exemplary embodiment of the component of FIG. 5.
Figure 6B:
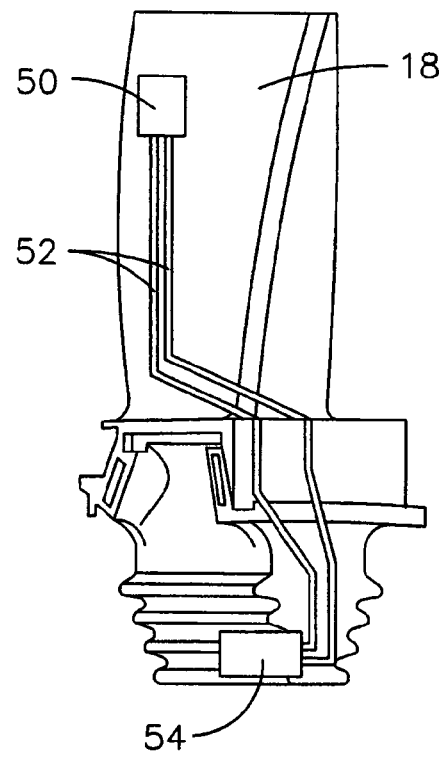
FIG. 6B is a schematic view of an exemplary embodiment of the component of FIG. 5.
Figure 6C:
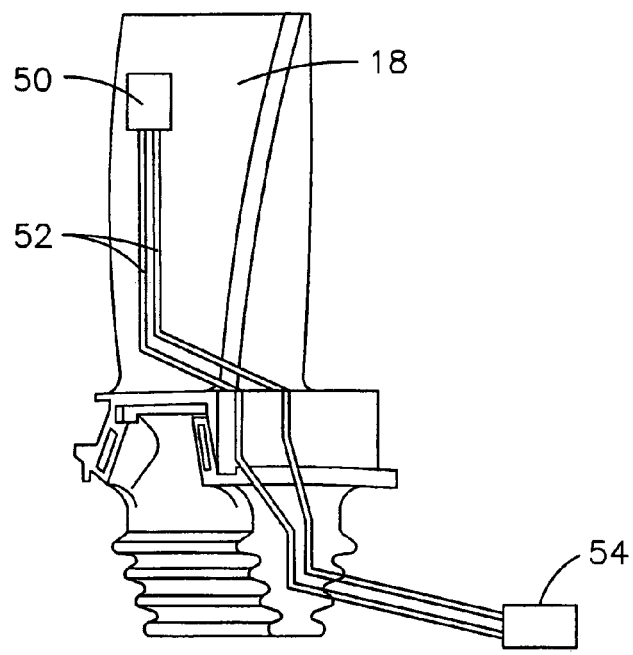
FIG. 6C is a schematic view of an exemplary embodiment of the component of FIG. 5.

FIG. 6A illustrates a schematic plan view of a blade 18 having an exemplary sensor 50 connected therewith and connector 52 connecting sensor 50 with transmitter 54. Transmitter 54 may be powered through induction generated within turbine 16 during operation that will be appreciated by those skilled in the art. FIGS. 6A, 6B and 6C illustrate exemplary embodiments of a turbine blade 18 having transmitter 54 placed in various locations. In FIGS. 6A and 6B transmitter 54 may be mounted to blade 18 and FIG. 6C illustrates that transmitter 54 may be located remote from blade 18. For example, transmitter 54 may be located remotely from blade 18 such as within a disk (not shown) to which a plurality of blades 18 is attached. In this respect, transmitter 54 may be maintained in a cooler location outside the hot gas path, which may increase the transmitter's useful life. Locating transmitter 54 remote from blade 18 allows for using an external power source for powering transmitter 54 rather than using a battery or induction.

A power supply may also be attached to sensor 50 to provide additional functionality to the sensor. This additional functionality could include mechanical actuation as a result of feedback to the sensor 50 output. Such an integrated system may be applicable for components, such as ring segments for real-time gap control.

The exemplary embodiments of compressor vane 23 and turbine blade 18 illustrated in FIGS. 3-6A, 6B and 6C configured with self-contained sensors 50 and connectors 52 are advantageous in that they may be prefabricated for installation in combustion turbine 10 by a field technician. Embodiments allow for a distal end 53 of connectors 52 to be exposed at a termination location. This location may be proximate a peripheral edge of a component or other location. This allows a field technician to quickly and easily connect connector 52 to a transmitter 54 regardless of its location.

Providing components of combustion turbine 10, such as vanes 23 and/or blades 18 with pre-installed sensors 50 and connectors 52 is a significant advantage over previous techniques for installing such components in the field, which typically required an extensive array of wires to be routed within combustion turbine 16. Providing components with pre-installed sensors 50 and connectors 52 allows for monitoring the condition of those specific components during operation of combustion turbine 10.

Embodiments of the invention allow for sensor 50 to be configured to perform a wide range of functions. For example, sensor 50 may be configured to detect wear of a single component or between two components, measure heat flux across a component's coating, detect spalling of a coating, measure strain across an area of a component or determine crack formation within a component or coating. U.S. patent application having application Ser. No. 11/018,816 discloses embodiments of a system that generally involves monitoring the wear of a component that may be configured in accordance with embodiments of the present invention.

Wear sensors 50 may be configured as embedded electrical circuits in a contact surface of a component, such as a tip of blade 18 and the circuit may be monitored by monitoring system 30 for indications of wear. By positioning a circuit at the wear limit, or at prescribed depths from the component's surface, the condition of the surface may be continuously monitored and system 30 may provide an operator with an advanced warning of service requirements.

It will be appreciated that sensor 50 may be configured for wear detection and prefabricated within a component for use within combustion turbine 10 either alone or in combination with a means for transmitting 52 in accordance with aspects of the present invention. In this respect, the signals extracted for detection of wear may be conducted via connectors 52 to transmitter 54, which may transmit the signals via wireless telemetry to a transceiver 56 and subsequently system 30.

Embodiments of the present invention allow for monitoring and control system 30 to collect and store historical data with respect to a component's wear and correlating the component's wear with the operating conditions of combustion turbine 10 responsible for producing the wear. This may be accomplished by continuously interrogating turbine 16 conditions, for example, by the deposition of piezoelectric devices and/or other sensors 50 configured for providing a continuous data stream indicative of the loading conditions, vibration frequency, resonance and other operating parameters experienced by various components within turbine 16. This data may be correlated to data indicative of a component's wear and used for predictive maintenance or other corrective actions.

Figure 7:
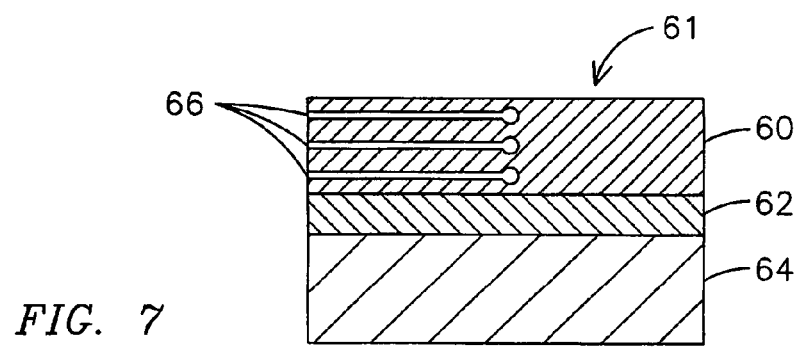
FIG. 7 is an exemplary embodiment of a heat flux sensor.

FIG. 7 illustrates another exemplary embodiment of a sensor 50 that may be configured as an exemplary heat flux sensor 61 for measuring heat flux across a barrier coating such as a thermal barrier coating (TBC) 60, which may be yttrium-stabilized zirconium. Using known techniques, thermal barrier coating 60 may be deposited on a bond coat 62, which may be deposited on a substrate 64. Substrate 64 may be various components such as a superalloy suitable for use in turbine 16, and in an embodiment may be a blade 18. The heat flux may be used to obtain the surface temperature of substrate 64 without having to expose the surface of substrate 64 to the surface temperature experienced by the upper surface of thermal barrier coating 60.

Thermocouples 66 may comprise a material having a coefficient of thermal expansion that substantially matches that of the material within which they are deposited, such as thermal barrier coating 60. In an embodiment, a plurality of temperature sensors, such as K-type thermocouples 66 may be embedded within a thermal barrier coating 60 with thermocouples 66 located vertically over each other as shown in FIG. 6. In an embodiment, thermocouples 66 may include a NiCr/NiAl thermocouple junction. Alternate embodiments allow for thermocouples 66 to be fabricated of other materials such as Pt and Pt—Rh for high temperature applications such as those within turbine 16.

Heat flux sensor 61 may be formed in different geometries to achieve a desired signal-to-noise ratio. Each thermocouple 66 may be approximately 25 microns thick but this thickness may vary depending on the application. Because the thermal barrier coating 60 may be several times as thick as thermocouples 66 they will not significantly alter the profile or performance of thermal barrier coating 60. Embodiments allow for post deposition laser micromachining to achieve a desired junction density.

As heat flows vertically into or out of thermal barrier coating 60, each thermocouple 66 will record a different temperature measurement. By measuring the temperature differences and knowing the thickness and thermal conductivity of thermal barrier coating 60, the heat flux can be obtained. Thermocouples 66 may be connected with a means for transmitting 52 as described herein so that the respective temperature measurements taken by each thermocouple 66 may be wirelessly transmitted to monitoring and control system 30.

Figure 8:
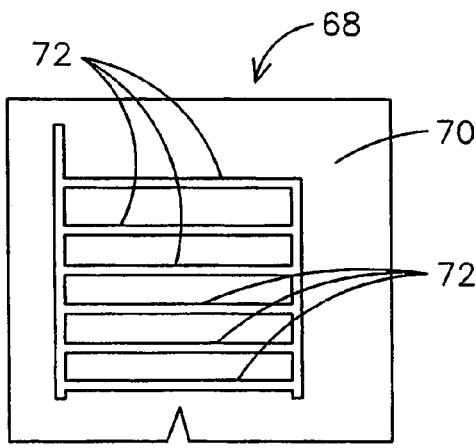
FIGS. 8 and 9 illustrate an exemplary embodiment of a strain gauge and a crack propagating to different lengths.
Figure 9:
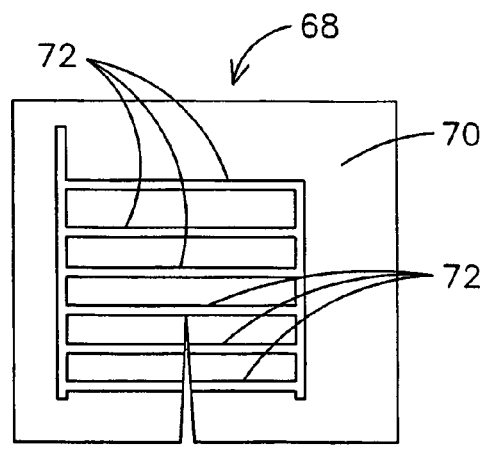

FIGS. 8 and 9 illustrate an exemplary embodiment of a sensor 50 that may be configured as an exemplary sensor 68 configured for detecting and/or measuring strain or a crack within a location of interest such as substrate 70. For example, substrate 70 may be a location of interest of a area of a blade 18, or it may be other locations of interest within or at the surface of thermal barrier coating 60 or bond coat 62. It will be appreciated that sensor 68 configured in this manner may be used in numerous places throughout combustion turbine 10. The sensors described in FIGS. 8 and 9 describe the utilization of the change in resistance to result in a strain output. Other embodiments of strain gauges could also include capacitive changes to determine the local strain values.

In this respect, critical engineering components, such as blades 18, 19 and vanes 22, 23 are nearly universally subjected to some form of mechanical and/or thermo-mechanical cyclic loading. Aspects of the invention allow for the assessment of component service life by the intermittent or continuous, in-situ measurement of applied strains and crack detection with respect to that component. This may be accomplished by the placement of embedded strain gages and crack sensors 68 in various locations within combustion turbine 10. Sensors 50 configured as a strain gauge 68 may be formed using a NiCr material for use in lower temperature applications, such as in compressor 12 of combustion turbine 10.

Sensors 68 may be used as crack sensors by placing them at locations or points where cracks are known or likely to appear. A crack sensor gauge 68 may be optimized for size, crack propagation, and crack extent through appropriate choice of gauge 68 parameters. Such parameters may include the footprint of gauge 68, spacing of fingers 72, and orientation of fingers 72 with respect to the direction of a predicted crack propagation. Crack formation in substrate 70 gives rise to a large, abrupt change in the strain gauge response, and may be detected by continuously monitoring the sensor 68 output for abrupt signal changes using signal processing techniques. Data indicative of the signal change may be conducted via a means for transmitting 54 to a transceiver 56 and subsequently transmitted to monitoring and control system 30 via wireless telemetry.

In an exemplary embodiment, a strain gauge sensor 68 may be bonded to or deposited on a surface of a compressor blade 19 and positioned so that bending stress on blade 19 varies the output signal from sensor 68. Connector 52, which may be wire leads, are routed to a transmitter 54 located on a rotating collar internal to compressor 12. Transmitter 54 may have an onboard bridge completion and provide a regulated voltage to sensor 68. As the output signal from sensor 68 varies an RF signal from transmitter 54 varies proportionally. The RF signal may be transmitted to a transceiver 56, which receives the RF signal and converts it into a voltage signal proportional to the strain detected by sensor 68. The RF signal may be transmitted to system 30. An exemplary transmitter 54 may pick up changes in strain from about 30 Hz to about 30 KHz.

Embodiments of the invention allow for using crack sensors 68 to monitor crack growth during operation of combustion turbine 10 and verify design models by varying component operating parameters until cracks are detected with the crack sensors 68. The design models will be calculated for the same operating parameters to see if they successfully predict crack growth and formation, and will be modified accordingly.

Monitoring and control system 30 may collect and store data indicative of strain and crack measurements from numerous components in critical locations within combustion turbine 10, such as blades 18, for example. Such data may be analyzed over time to develop a strain history for each component. A component's strain history may include the magnitude and orientation of strains, and the occurrence of overloads under cyclic loading. An appraisal of fatigue damage may be developed and used for predictive maintenance.

Embodiments of the present invention allow for deploying a plurality of sensors 50 throughout combustion turbine 10 by either surface mounting them to components or embedding them within respective component barrier coatings to collect specific component condition data and transmit that data using wireless telemetry to monitoring and control system 30. This approach is advantageous in that it allows for the replacement, repair and maintenance decision-making processes to be based on the condition of specific components during operation of combustion turbine 10.

In this respect, specific component condition data may be received by antenna 32 and receiver 33 then stored in database 36 by CPU 34. Embodiments allow for specific component condition data to be collected and presented to an operator in real time via display 38. This allows for an operator to make instantaneous decisions regarding the operation of combustion turbine 10 in response to the condition of a specific component or components.

Historical data may be compiled and analyzed with respect to each component for making repair, replacement or maintenance decisions with respect to that component. Operating conditions and specific components of combustion turbine 12 may be monitored sets of conditions may be isolated that are indicative of a component or components needing to be repaired or replaced, or of corrective action to be taken with respect to operation of the gas turbine. These aspects allow for significant improvement in predictive maintenance schedules.

Figure 10:
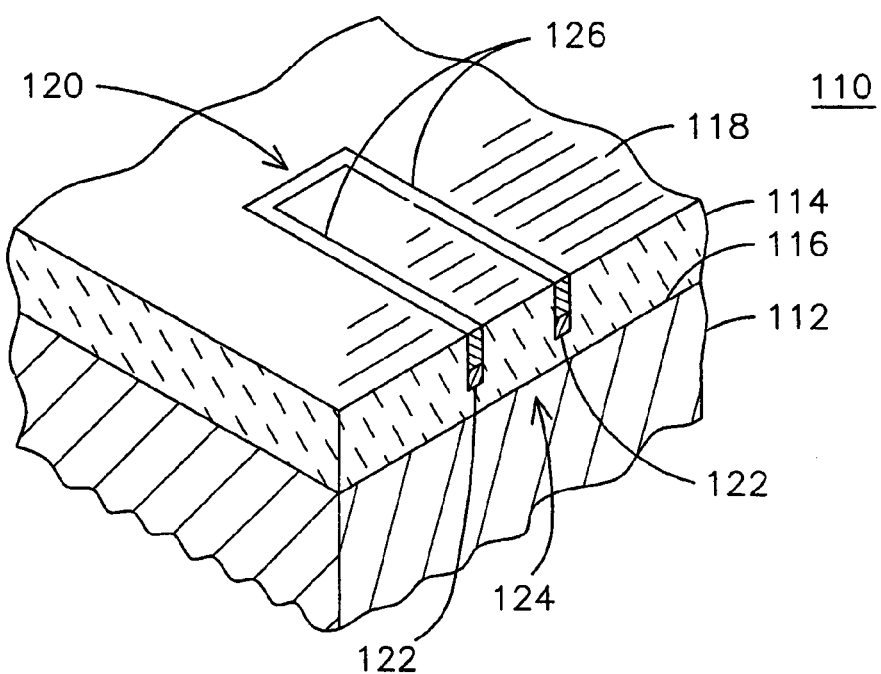
FIG. 10 is a partial perspective view of a component having a sensor embedded within a layer of thermal barrier coating material disposed over a substrate material.

FIG. 10 is a partial perspective illustration of a component 110 formed of a substrate material 112 having a barrier coating such as a layer of thermal barrier coating 114 disposed on one surface 116. The component 110 may be part of a gas turbine engine 10 of FIG. 1, for example, or any other machine wherein a base material must be protected from an external environment by a layer of a barrier material. In an embodiment, component 110 may be an airfoil member, such as a turbine blade 18 disposed in the hot gas flow path of a engine 10 with an oxide or non-oxide ceramic TBC 14 such as mullite, silicon carbide or a zirconium-based ceramic overlying a superalloy substrate material 112.

Component 110 may alternatively be fabricated from a ceramic matrix composite (CMC) substrate coated with an environmental barrier coating (EBC) or a thermal barrier coating (TBC). Because the integrity of the coating 114 is critical to the overall integrity of the component 110, it is useful to obtain operating parameter information that directly affects the performance of the coating 114. Such information is obtained by embedding a sensor, such as a sensor 50 below the exposed surface 118 of the TBC 114. The sensor is not visible in FIG. 10 but may be located below surface 118 in the sensing location indicated generally by numeral 120.

The sensor may be one that provides a signal indicative of temperature, strain, crack initiation, chemical changes, vibration, acceleration, pressure or other parameters of interest. These sensors themselves could be multi-layered containing a combination of electrodes and the functional body. For example, pressure may be measured using a thermally sprayed piezoelectric load cell and acceleration (vibration) may be measured using a thermally sprayed piezoelectric or piezoresistive accelerometer embedded within coating 118.

Conductors 122 may be located below surface 118 and route the signal produced by the sensor away from sensing location 120 to a termination location, which may be a connection location indicated generally by numeral 224 where they can conveniently exit the component 110. Conductors 122 may function similarly to connectors 52 for routing a signal from a sensor, such as a sensor 50 to a transmitter 54 for transmission to system 30 via wireless telemetry. The sensor and conductors 122 may be insulated from the surrounding environment by insulating layer 126.

Figure 11:
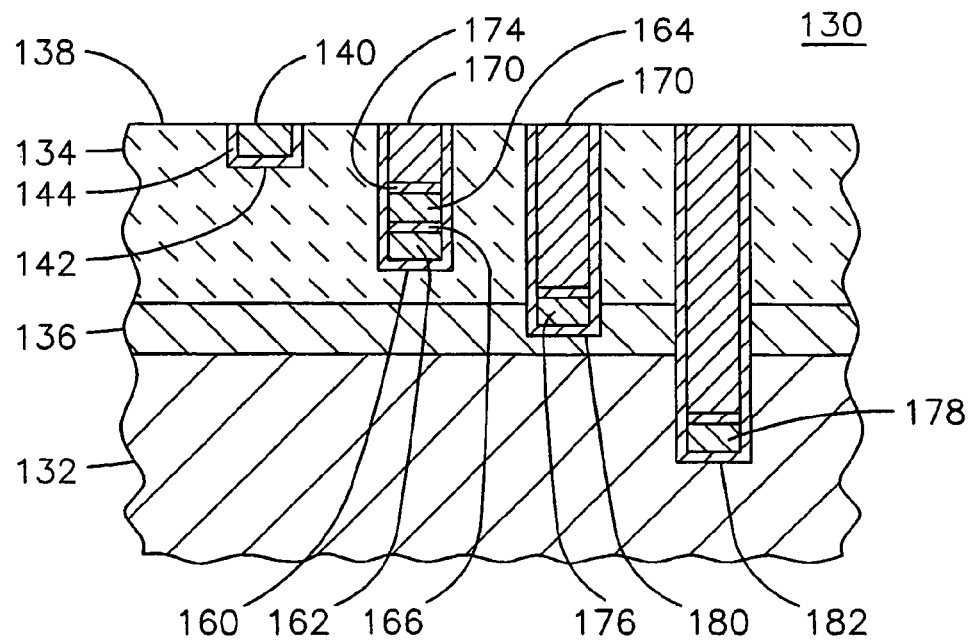
FIG. 11 is a partial cross-sectional view of a component having a plurality of sensors embedded at varying depths below a surface of the component.

FIG. 11 is a partial cross-sectional view of another component 130 having a substrate material 132 covered by a barrier coating such as a layer of a thermal barrier coating material 134 for use in a very high temperature environment. As is well known in the art of TBC coatings, a bond coat 136 such as an MCrAlY material may be deposited on the substrate 132 prior to the application of the TBC material 134 to improve the adherence of the coating 134 to the substrate 132.

Component 130 may be instrumented by a plurality of sensors, such as sensors 50 embedded at a plurality of depths below a surface 138 of the TBC material 134 that is exposed to the external environment. A first sensor 140 is deposited in a relatively shallow trench 142. Trench 142 may be lined with an electrically insulating coating 144 such as aluminum oxide to prevent the grounding of sensor 140 to the TBC material 134. Sensor 140 may take any form known in the art, for example a thermocouple formed by a bimetallic thermocouple junction or other sensors described herein. The surface location of sensor 140 suggests that it may be useful for sensing a parameter related to the external environment, such as temperature or a chemical parameter.

Figure 12:
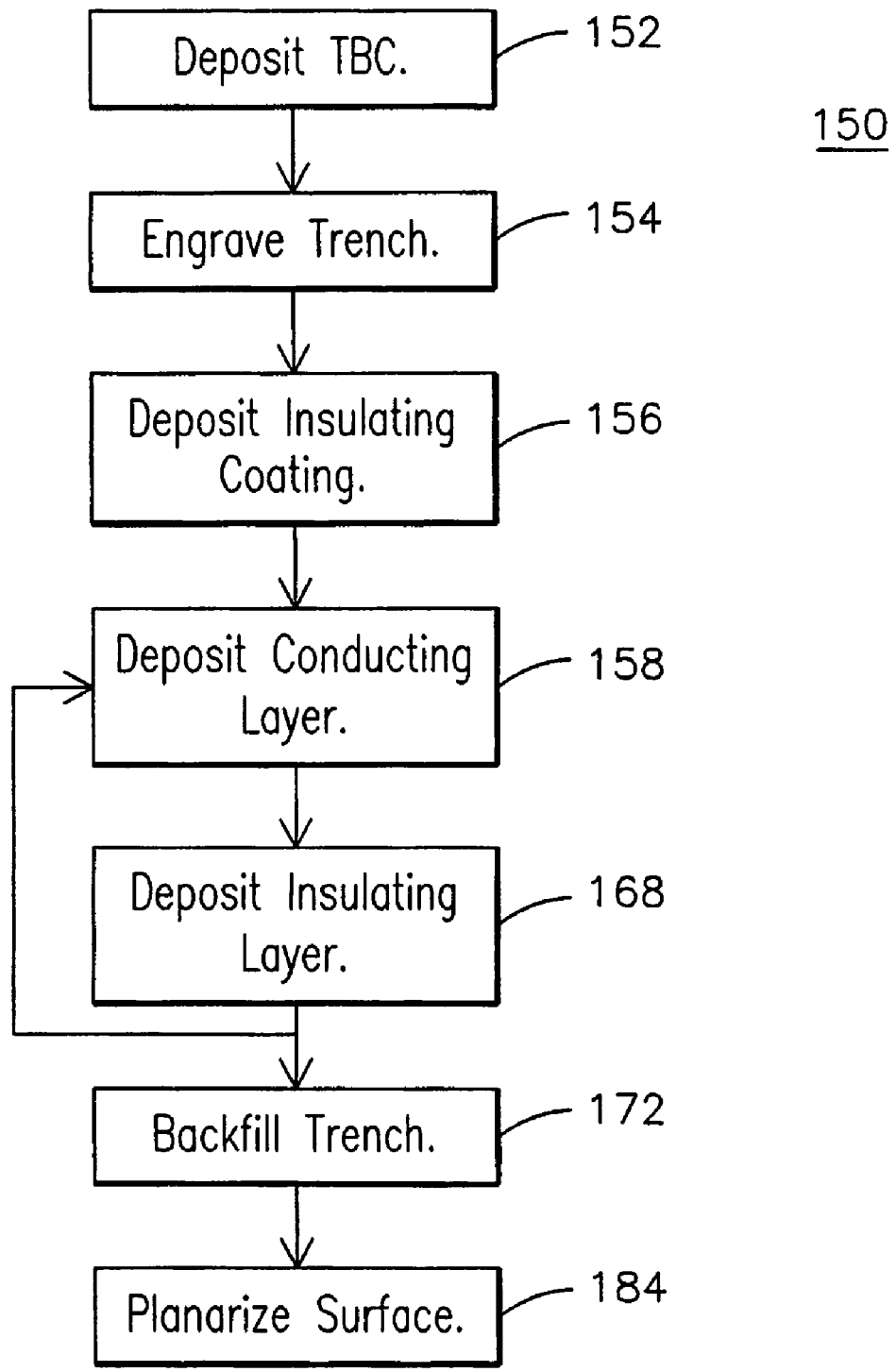
FIG. 12 is a process diagram illustrating steps in a method of manufacturing the component of FIG. 11.

FIG. 12 illustrates the steps of a process 150 that may be used during the manufacturing of the component 130 of FIG. 11. In step 152, a layer of thermal barrier coating material 134 may be deposited onto a substrate 132. After step 152, the component is completed in its normal operating shape as it may be used without embedded instrumentation. One skilled in the art may appreciate, therefore, that the process 150 may be applied to newly fabricated components or it may be back fit to an existing component that is in inventory or that has been in service.

In step 154, a trench 142 may be formed in a surface 138 of the component 130. Trench 142 may be formed to any desired shape by any known method, such as by laser engraving trench 142 to have a generally rectangular cross-section with a predetermined width and depth. Variables for such a laser engraving process include spot size, power level, energy density, pulse frequency, and scan speed. These variables together affect the trench width, depth, material removal rate and the cost of manufacturing. Trench 142 may have a constant cross-sectional size and shape along its entire length, or it may vary in size and/or shape from one region to another. For example, in the component 110 of FIG. 10, a trench formed in the sensing location 120 may have different dimensions than the trench extending from the sensing location 120 to the connecting location 124, since the sensor and the conductors 122 may have different geometries. The trench 142 may also be inclined to the surface, i.e. varying in depth along its length, which in some applications may provide improved mechanical integrity within the component.

After trench 142 is formed at step 154, an insulating coating 144 may be applied to the surfaces of the trench 142 at step 56 in order to provide electrical isolation between sensor 140 and TBC material 134. Insulating coating 144 may be deposited by any known method such as chemical vapor deposition (CVD) to a thickness sufficient to achieve a desired level of electrical isolation. Once the trench 142 is formed at step 154 and insulated at step 156, the sensor 140 may be formed by depositing the appropriate material or materials into trench 142 at step 158. Any known material deposition process providing the desired material properties may be used. Such processes are common in the fields of rapid prototyping, thin and thick film deposition, and thermal spraying, and include, for example, chemical vapor deposition, plasma spray, microplasma spray, cold spray, electroplating, electrophoretic deposition, HVOF, sputtering, CCVD, sol-gel and selective laser melting. Processes typically used for the fabrication of multi-layer thick film capacitors may also be used, such as the application of pastes and tapes of the desired materials.

After the deposition of material, a heat input may be used to sinter the material, thereby increasing the mechanical integrity of the sensor. This can be done either by heating using a flame, plasma, furnace annealing or localized laser energy application. In the selective laser melting (SLM) process, powdered material having a predetermined chemistry may be deposited into the trench and melted with the energy of a laser beam to form the respective portion of the sensor 140 of FIG. 11 or the interconnecting conductors 122 of FIG. 10. For example, to form a thermocouple, platinum powder may be deposited into one portion of trench 142 and solidified by a SLM process. Platinum-rhodium powder may then be deposited into a second portion of trench 142, either along the trench length or as a second vertical layer, and solidified by a SLM process to contact the platinum material to form the thermocouple junction.

Note that the geometry of trench 142 may have a direct effect on the geometry of the sensor 140. Accordingly, it is possible to affect the operating parameters of sensor 140 or interconnecting conductors 122 by controlling the dimensions of the respective trench 142. For example, the resistance of a conducting line formed within a trench will be affected by the width of the trench. The laser engraving process of step 154 may be closely controlled to achieve a desired trench geometry. Certain commercially available processes for depositing a conductor onto a flat surface by thermal spraying may not produce the fine features that may be necessary for sensors and conductive lines. Such processes may rely on a subsequent material ablation process to achieve a desired geometry. Because trench 142 provides control of the width of the feature, no such trimming step is needed in the process 150 of FIG. 12.

FIG. 11 also illustrates a second trench 160 formed in the TBC material 134 to a second depth that is farther below surface 138 than trench 142. By forming a plurality of trenches 142, 160 at a plurality of depths below surface 138, it is possible to place sensors, such as sensors 50 at more than one depth within the component 130, thereby further augmenting the available operating parameter data. In the embodiment of FIG. 11, trench 160 contains two vertically stacked conducting layers 162, 164 separated by an insulating layer 166. The conducting layers 162, 164 may form two portions of a sensor, or two conducting lines for connecting a sensor to a connecting location. 1As illustrated in FIG. 12, the two conducting layers 162, 164 may be formed by first depositing conducting layer 162 at step 158, and then depositing an insulating layer 166 at step 168 using any desired deposition technique, such as CVD.

Steps 158, 168 are then repeated to deposit conducting layer 164 and insulating layer 174. The width of these layers is controlled by the width of trench 160 and the thickness of these layers may be controlled as they are deposited to achieve predetermined performance characteristics. For example, the thickness of insulating material 166 will affect the impedance between the two conducting layers 162, 164. Conducting layer 164 is then isolated from the external environment by backfilling the trench 160 with a barrier material such as thermally insulating material 170 at step 172. Insulating material 170 may be the same material as TBC material 134 or a different material having desired characteristics. Insulating material 170 may be deposited by any known deposition technique, including CVD, thermal spraying, selective laser melting, or selective laser sintering. Selective laser melting and selective laser sintering processes are known in the art, as exemplified by Chapters 6 and 7 of "Laser-induced Materials and Processes For Rapid Prototyping" by L. Lu, J. Y. H. Fuh, and Y. S. Wong, published by Kluwer Academic Publishers.

Additional sensors 176, 178 may be disposed at preselected depths within component 130 by forming respective trenches 180, 182 to appropriate depths. Trenches 180, 182 may be backfilled with insulating material 170 to the level of surface 138 at step 172. Planarization of surface 138 may be performed at step 184, if necessary, such as when surface 138 forms part of an airfoil. By forming a trench to a desired depth, a sensor may be embedded to within the TBC material layer 134, to within the bond coat material layer 136, to within the substrate material 132, or to a depth of an interface between any two of these layers.

Thus, it is possible to develop actual operating parameter data across a depth of a component or across the depth of the thermal barrier coating. Such data may be useful for confirming design assumptions and for updating computerized models, and it may also be useful as an indicator of damage or degradation of a TBC coating. For example, a sensor 178 embedded below the TBC material 134 may produce a signal indicating a significant temperature rise in the event of cracking or spalling of the layer of TBC material 134. Alternatively, the detection of a predetermined level of vanadium, sodium or sulfur deposits by an embedded sensor 176 may announce conditions that would give rise to spalling and failure of the TBC coating 134 if the component were to remain in service for an extended period. This process facilitates the placement of sensors at any location on a fully assembled and coated part. Electrochemical sensors on the component surface can play an important role in determining the nature and effect of corrosion products present in the surrounding environment.

Figure 13:
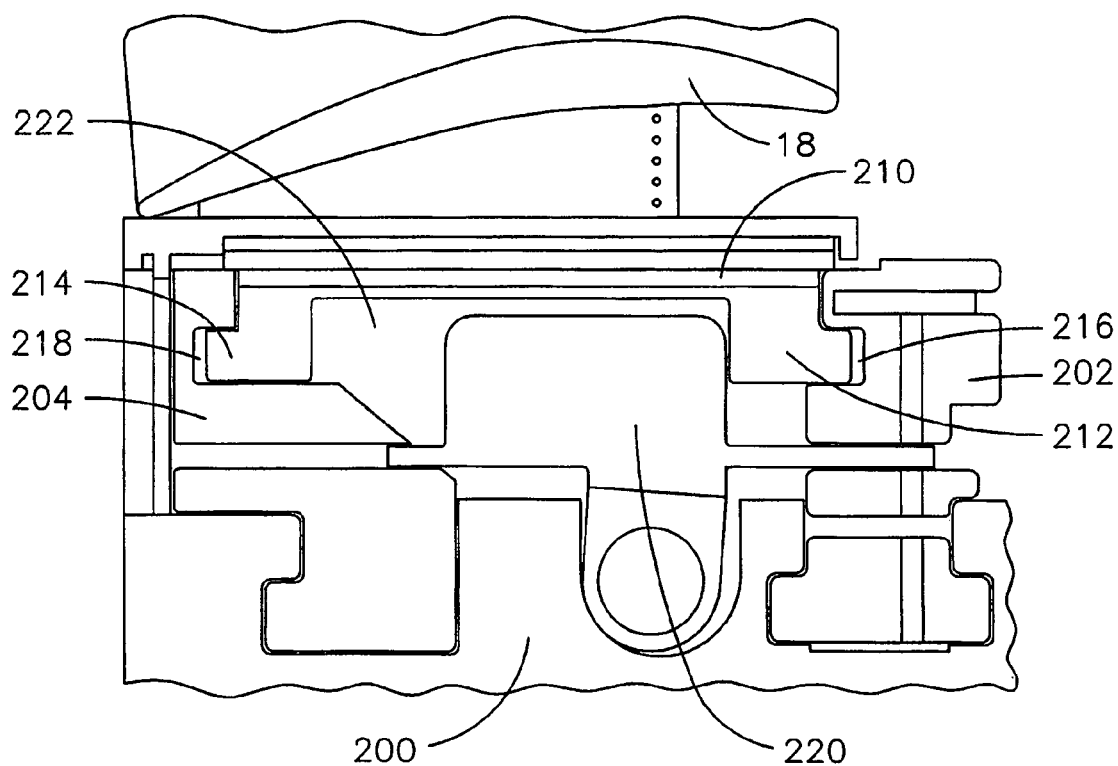
FIG. 13 is a plan view of a portion of an exemplary turbine.

Embodiments of sensors may be used in various places within combustion turbine 10 as load cells and accelerometers. FIG. 13 illustrates a plan view of a portion of turbine 16 that will be understood by those skilled in the art. A casing 200 of turbine 16 may have a forward isolation ring 202 and an aft isolation ring 204 slip fit within respective grooves formed within casing 200. A ring segment 210 may be slip fit within respective grooves formed within isolation rings 202, 204. Ring segment 210 may include forward hooks 212 and aft hooks 214 that fit respectively within forward groove 216 and aft groove 218 of isolation rings 202, 204. An anti-rotation locking mechanism 220 may be adjustably mounted to casing 200 for preventing circumferential motion of ring segment 210 within grooves 216, 218.

FIG. 13 also illustrates a portion of a turbine blade such as a blade 18 that is attached to a rotor disk (not shown) as recognized by those skilled in the art. A plurality of blades 18 are typically attached to the rotor disk and rotate as a working gas flows through turbine 12. A cooling flow channel 222 may be formed between ring segment 210 and casing 200 through which air may flow to cool components outside the hot gas path. Air flowing through cooling flow channel 222 may be at a higher pressure than air pressure within the hot gas path, which helps to ensure that the cooling air flows out of and not into the hot gas path. This pressure differential may cause one or more ring segments 210 to be biased radially inwardly toward blade 18 during operation.

Figure 14:
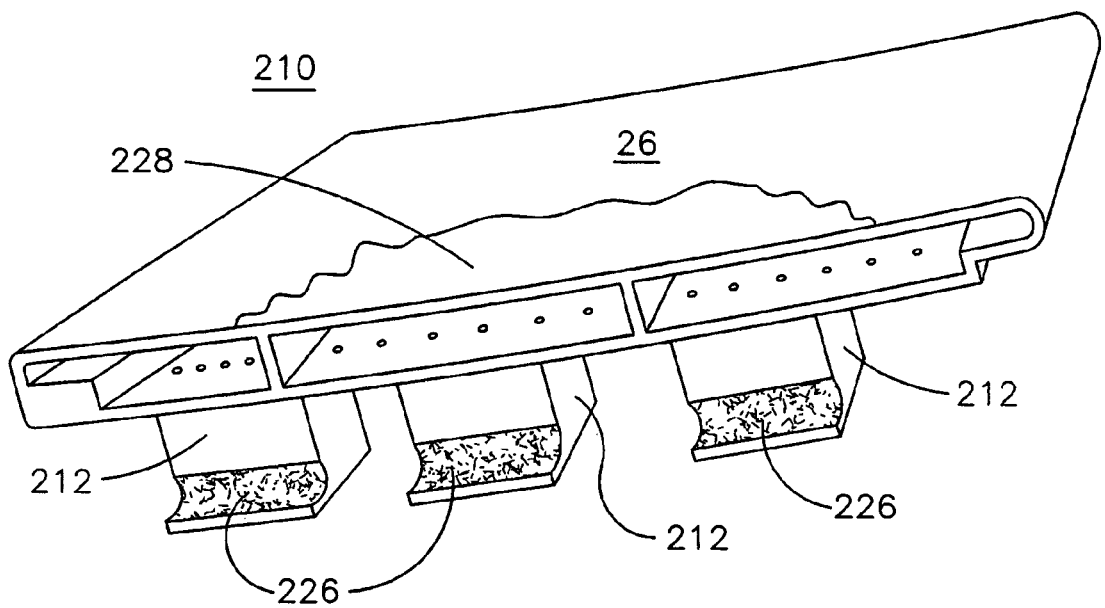
FIG. 14 is an exemplary ring segment of a combustion turbine.

FIG. 14 illustrates an exemplary ring segment 210 removed from isolation rings 202, 204, which may have a coating such as a TBC 26 applied on an interior surface. TBC 26 insulates ring segment 210 from high temperatures and helps to minimize the amount of air flowing through channel 222 required to cool components outside the hot gas path. The interior surface is exposed to blade 18 during operation of turbine 16. It has been determined that during operation of combustion turbine 10 the interface between hooks 212 of ring segment 210 may wear against an adjoining portion of groove 216 of isolation ring 202.

As shown in FIG. 14, wear areas 226 may be formed in hooks 212 due to their rubbing against surfaces created by groove 216. Similar wear areas may occur on other components. This rubbing or impinging is due to vibration during operation of combustion turbine 10 and ring segment 210 being urged radially inwardly toward blade 18 because of the air pressure differential between cooling flow channel 222 and the hot gas path. As ring segment 210 is urged inwardly TBC 26 may be gradually worn away such as in surface area 228 due to the tip of blade 18 rubbing against the coating. Damage to the tip of turbine blade 18 may also result. This wearing away on one or more ring segments 210 or damage to blade 18 may lead to inefficient operation of combustion turbine 10, an increase in demand for cooling air, or cracking in or critical failure of ring segment 210 or turbine blade 18.

When ring segment 210 is initially slip fit within isolation rings 202, 204 via hooks 212, 214 the interface or contact surfaces between hooks 212, 213 and surfaces defined by respective grooves 216, 218 form close tolerances. When combustion turbine 10 is in operation vibration causes the contact surfaces to rub against one another, which may lead to wear areas 226 and eventually to wear in surface area 228 of TBC 26 on ring segment 210. It would be advantageous to detect and monitor the pressures being exerted in these contact areas to measure or predict wear there between and prevent an unacceptable wearing of TBC 26. Traditional sensors are not suited for this application due primarily to their size and poor reliability due to their attachment method.

Figure 15:
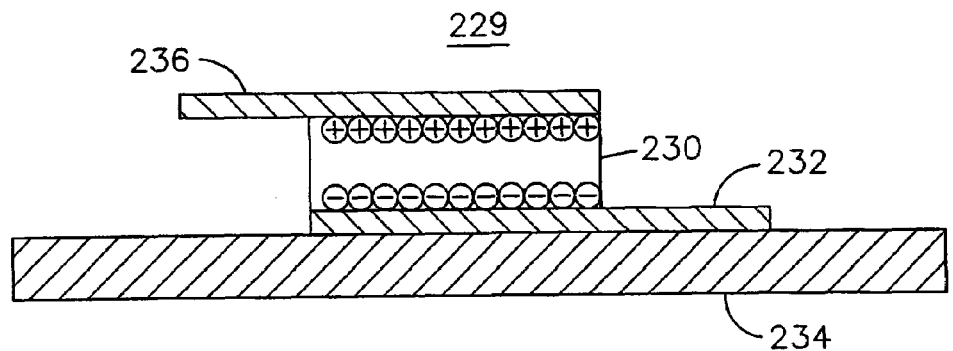
FIG. 15 is an exemplary embodiment of a load cell.

FIG. 15 illustrates an exemplary embodiment of a sensor 50, such as a load cell 229 that may be deposited in accordance with aspects of the invention. The inventors of the present invention have determined that the direct write apparatus and process may be uniquely applied to deposit sensors in areas that have previously been inaccessible using traditional sensors. In this respect, a sensor 50 may be deposited as load cell 229 comprising a piezoelectric material 230 using the direct write apparatus or process. Conductive material may be deposited to form conductive leads 232, 236, which may extend to termination point for connection with a wireless amplifier and signal conditioner for load or vibration measurement. In an embodiment, a first or bottom insulating layer (not shown) may be deposited on a substrate 234 to insulate conductive lead 232. Substrate 234 may be various components of combustion turbine 10 including portions of one or more hooks 212.

Piezoelectric material 230 may be deposited on conductive lead 232 with conductive lead 236 deposited on top of material 230. An insulating layer (not shown) may be deposited over conductive lead 236 with another protective layer deposited on top of the insulating layer such as a wear resistant coating, TBC or other material to build the surface to a desired dimension. Conductive leads 232, 236 may be connected with a conventional or wireless amplifier and data signals extracted from load cell 229 may be transmitted to control system 30 via transmitters such as transmitters 54. It will be appreciated that sensors 50 formed as a load cell 229 may be deposited in various configurations, orientations and locations depending on a particular application. For example, load cells 229 may be modified and directionally oriented for detecting and measuring bending and shear forces experienced at a point of interest.

Figure 16:
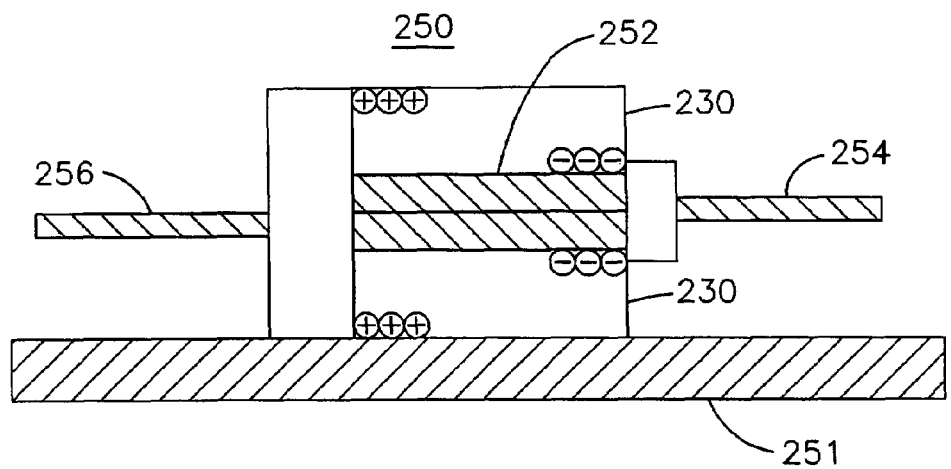
FIG. 16 is an exemplary embodiment of an accelerometer.

FIG. 16 illustrates an exemplary embodiment of a sensor 50, such as an accelerometer 250 that may be deposited using the direct write apparatus and process in accordance with aspects of the invention. A sensor 50 may be deposited as an accelerometer 250 comprising a piezoelectric material 230 deposited on substrate 251 using the direct write method and apparatus. Substrate 251 may be various components of combustion turbine 10 including portions of one or more hooks 212. A central inertial mass 252 of suitable material may be deposited within piezoelectric material 230. Mass 252 has a sufficient density for creating appreciable shear forces in cooperation with piezoelectric material 230. Conductive material may be deposited to form conductive leads 254, 256. Insulating layers (not shown) may be deposited to insulate conductive leads 254, 256 from surrounding material.

Conductive leads 254, 256 may be extend to a termination location for connection with a conventional or wireless amplifier and data signals extracted from accelerometer 250 may be transmitted to control system 30 via transmitters such as transmitters 54. It will be appreciated that sensors 50 formed as an accelerometer 250 may be deposited in various configurations, orientations and locations depending on a particular application.

Figure 17:
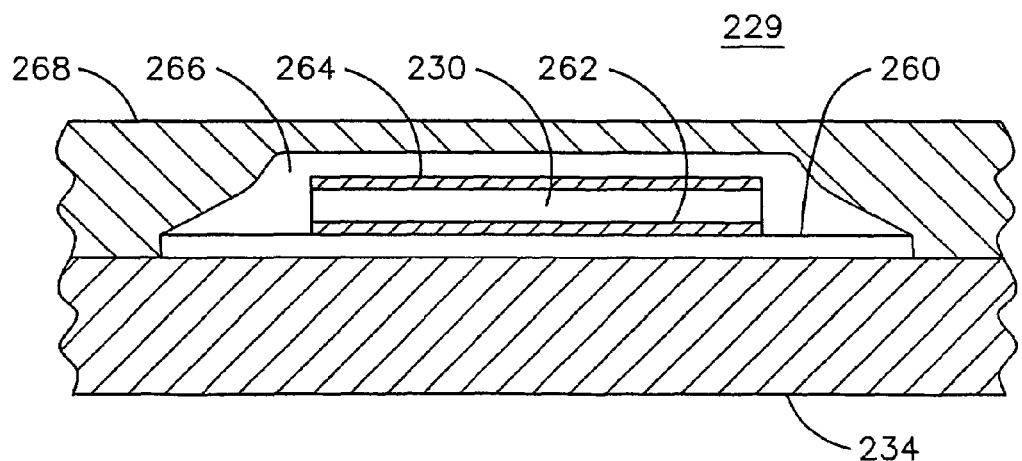
FIG. 17 is a cross section of the load cell of FIG. 15.

FIG. 17 illustrates a cross section of an exemplary load cell 229 deposited on substrate 234. An insulating layer 260 may be deposited on substrate 234 with a first conductive layer or lead 262 deposited on layer 260. Piezoelectric material 230 may be deposited on layer 260 with a second conductive layer or lead 264 deposited on piezoelectric material 230. An insulating layer 266 may be deposited over layers 260, 262, 230 and 264 to encapsulate the sensor and ensure first and second conductive leads 262, 264 and insulated from each other. A top layer 268 such as a wear resistant coating or TBC may be deposited on or over insulating layer 266. This coating may vary in thickness depending on the specific application.

Load cell 229 and accelerometer 250 may be used for detecting and measuring vibration or loading at points of interest within combustion turbine 10. In exemplary embodiments, they may be deposited directly onto the surface of a component or within a recess formed within a component. Voltage and frequency response may be measured for identifying wear drivers and responses of material and combustion turbine 10 operations to the wear. Coatings may be deposited there over such as a wear resistant coating using a thermal spray process. Embodiments of load cell 229 and accelerometer 250 may be deposited within trenches formed in barrier coatings as disclosed in U.S. Pat. No. 6,838,157. Embodiments of load cell 229 and accelerometer 250 may have piezoelectric material 230 deposited directly onto a surface of a conductive substrate where the conductive substrate functions as one of the conductive leads forming a respective sensor 50.

Embodiments of the invention allow for areas of components of combustion turbine 10 to be repaired in the field. For example, as shown in FIGS. 13 and 14, wear areas 226 on hooks 212 of ring segment 210 may be caused by hooks 212 rubbing against surfaces of isolation ring 202 formed by groove 216. Such wear areas 226 may be repaired by removing ring segment 210 from isolation rings 202, 204 and depositing a coating, such as a wear resistant coating over the wear areas 226. This depositing builds the worn area of a hook 212 back up to its original dimension.

In an embodiment of the invention, an exemplary load cell 229 and/or accelerometer 250 may be deposited as part of the wear resistant coating deposited over a wear area 226. In this respect, the load cell 229 may be deposited within the wear resistant coating precisely at a location of interest. The location of interest may be the contact surfaces between a hook 212 and a respective surface of isolation ring 202 against which hook 212 rubs during operation of combustion turbine 10. Instrumenting ring segment 210 with one or more load cells 229, for example, at these areas of interest is advantageous because it allows for data to be extracted with respect to loads, pressure and relative movement realized at the contact surfaces.

Exemplary embodiments of load cells 229 and/or accelerometers 250 may be deposited within original components for use in combustion turbine 10 or existing components within combustion turbine 10 may be retrofit with embodiments of these sensors. In certain situations an existing or to be applied coating, such as a wear resistant coating may be relatively thin, i.e., about 3 mils. In this situation, load cell 229 and/or accelerometer 250 may be deposited within a recess or trench formed within the surface of the component or barrier coating. A wear resistant coating may be re-deposited or deposited over load cell 229 and/or accelerometer 250 so the wear resistant coating is at a desired thickness.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method of instrumenting a first component for use in a combustion turbine engine, the first component comprising a surface contacted by a second component during operation of the combustion turbine engine, the method comprising:
    depositing an insulating layer on the surface of the first component;
    depositing a first conductive lead on the insulating layer;
    depositing a piezo-material in electrical communication with the first conductive lead; and
    depositing a second conductive lead in electrical communication with the piezo-material and insulated from the first conductive lead to form a sensor for detecting pressure exerted on the surface of the first component during operation of the combustion turbine engine.

2. The method of claim 1, the steps of depositing comprising using a direct write thermal spray process.

3. The method of claim 1 further comprising forming the sensor in a worn surface of the component.

4. The method of claim 3 further comprising depositing a wear resistant coating over the sensor.

5. The method of claim 1 further comprising forming the sensor as a load cell.

6. The method of claim 1 further comprising depositing a central mass to form the sensor as an accelerometer.

7. The method of claim 1 further comprising:
    forming at least one trench to a predetermined depth in a layer of barrier coating material deposited on the surface of the first component; and
    forming the sensor within the at least one trench.

8. The method of claim 7 further comprising:
    refilling the at least one trench with a protective coating.

9. A component comprising:
    an insulating layer deposited on a surface of the component;
    a first conductive lead deposited on the insulating layer;
    a piezo-material deposited on the first conductive lead; and
    a second conductive lead deposited on the piezo-material to form a sensor for detecting pressure exerted on the surface of the component.

10. The component of claim 9 further comprising a protective coating deposited over the sensor.

11. The component of claim 9 further comprising a central mass deposited within the piezo-material to form the sensor as an accelerometer.

12. The component of claim 9 further comprising:
    a wear resistant coating deposited on the surface of the component; and
    at least one trench formed in the wear resistant coating wherein the sensor is deposited within the at least one trench.

13. The component of claim 12 further comprising a wear resistant coating deposited over the sensor.

14. A component for use in a combustion turbine engine, the component comprising a piezo-material embedded beneath a surface of the component, the surface being contacted by a second component during operation of the combustion turbine engine.

15. The component of claim 14 further comprising a wear resistant material defining the surface of the component.

16. The component of claim 14 further comprising a central mass deposited within the piezo-material forming an accelerometer.

17. The component of claim 14 further comprising:
    a first conductive lead extending from the piezo-material to a termination location; and
    a second conductive lead extending from the piezo-material to the termination location.

18. The component of claim 14 further comprising:
    a barrier coating material defining the surface of the component; and
    at least one trench formed within the barrier coating material wherein the piezo-material is deposited within the at least one trench.

19. The component of claim 18 further comprising:
    a first conductive lead deposited within the at least one trench and extending from the piezo-material to a termination location; and
    a second conductive lead deposited within the at least one trench and extending from the piezo-material to the termination location whereby a load cell is formed for detecting a load on the surface of the component during operation of the combustion turbine engine.

20. A method of instrumenting a component for use in a combustion turbine engine, the component comprising a conductive substrate, the method comprising:
    depositing a piezo-material on a surface of the conductive substrate;
    depositing an insulating layer on the conductive substrate to a termination location; and
    depositing a conductive lead on the insulating layer extending from the piezo-material to the termination location.

21. The method of claim 20 wherein the surface is contacted by a second component during operation of the combustion turbine engine.

22. The method of claim 20 further comprising:
   forming a recess within the surface of the conductive substrate; and
   depositing the piezo-material in the recess.

23. The method of claim 22 further comprising depositing a wear resistant coating over the piezo-material.

24. The method of claim 20 wherein the surface is non-planar and the steps of depositing comprising using a direct write thermal spray process.

* * * * *